United States Patent
Choiniere et al.

(10) Patent No.: US 11,178,210 B2
(45) Date of Patent: Nov. 16, 2021

(54) TRANSMISSION OF VISUAL CONTENT TO DISPLAY DEVICES BASED ON LOCATION DETECTION

(71) Applicant: Bank of America Corporation, Charlotte, NC (US)

(72) Inventors: Matthew M. Choiniere, Charlotte, NC (US); Griffin Rice, Charlotte, NC (US); Rosemary Hill, Jacksonville, FL (US); Arpit Gupta, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/571,999

(22) Filed: Sep. 16, 2019

(65) Prior Publication Data

US 2021/0084099 A1 Mar. 18, 2021

(51) Int. Cl.
*G06F 15/16* (2006.01)
*H04L 29/08* (2006.01)
*G06F 21/31* (2013.01)

(52) U.S. Cl.
CPC .............. *H04L 67/06* (2013.01); *G06F 21/31* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,349,290 B1 | 2/2002 | Horowitz et al. | |
| 6,456,981 B1 | 9/2002 | Dejaeger et al. | |
| 7,195,157 B2 | 3/2007 | Swartz et al. | |
| 7,925,549 B2 | 4/2011 | Looney et al. | |
| 8,775,238 B2 | 7/2014 | Angell et al. | |
| 8,869,207 B1 * | 10/2014 | Earle ................ | H04N 21/25808 725/48 |
| 9,471,759 B2 | 10/2016 | Jones | |
| 9,595,058 B2 | 3/2017 | Khalid | |
| 9,626,684 B2 | 4/2017 | Angell et al. | |
| 9,699,599 B2 | 7/2017 | Cardinal et al. | |
| 10,028,081 B2 | 7/2018 | Scanlon et al. | |
| 10,074,130 B2 | 9/2018 | Hanson | |
| 10,108,952 B2 | 10/2018 | Hanson et al. | |
| 10,623,794 B2 * | 4/2020 | Pejhan ................ | H04N 21/4825 |
| 2012/0233640 A1 * | 9/2012 | Odryna .............. | H04N 21/4622 725/45 |
| 2013/0152139 A1 * | 6/2013 | Davis ..................... | H04H 60/61 725/61 |

(Continued)

*Primary Examiner* — Phuoc H Nguyen
(74) *Attorney, Agent, or Firm* — Banner & Witcoff, Ltd.; Michael A. Springs

(57) ABSTRACT

Aspects of the disclosure relate to transmission of visual content to a display device. A computing platform may receive user information corresponding to a user. The computing platform may determine, based on authentication information in the user information, a profile corresponding to the user, and further determine a visual data file. The computing platform may determine, based on the user information, a display device, among a plurality of display devices. The computing platform may add the visual data file to a playlist associated with the display device. The computing platform may transmit, to the display device, data corresponding to the visual data file.

22 Claims, 7 Drawing Sheets

(56) References Cited

U.S. PATENT DOCUMENTS

| | | | |
|---|---|---|---|
| 2013/0268593 A1* | 10/2013 | Parekh | G06Q 30/0631 |
| | | | 709/204 |
| 2014/0115633 A1* | 4/2014 | Selim | H04L 51/32 |
| | | | 725/46 |
| 2014/0130099 A1* | 5/2014 | Kunisetty | H04N 21/4821 |
| | | | 725/50 |
| 2016/0148164 A1* | 5/2016 | Luk | G06Q 10/1095 |
| | | | 705/7.19 |
| 2016/0294909 A1* | 10/2016 | Killick | H04W 4/21 |
| 2018/0227066 A1* | 8/2018 | Fayyad | G06Q 30/0269 |

* cited by examiner

TRANSMISSION OF VISUAL CONTENT TO DISPLAY DEVICES BASED ON LOCATION DETECTION

FIELD

Aspects described herein generally relate to generation and transmission of visual data to display devices. Further aspects of this disclosure relate to use of various location detection technologies for dissemination of visual content.

BACKGROUND

Electronic display systems, although an effective tool for dissemination of information, generally only display preloaded and preset content. In locations where a large number of display devices may be available (e.g., a convention center, a public space, a commercial establishment, or the like) delivery of only preset content to the display devices may not always be the most effective tool for dissemination of information. Universal availability of wireless devices, in association with connectivity within a larger communication network, has opened avenues for interfacing personal wireless devices with external devices and services.

SUMMARY

Aspects of the disclosure provide effective, efficient, scalable, and convenient technical solutions that address and overcome technical problems associated with generation of visual content, and transmission of the visual content to a display device. In particular, one or more aspects of the disclosure relate to identifying a user and various location-detection technologies for delivery of user-relevant content to a plurality of display devices.

In accordance with one or more arrangements, a computing platform having at least one processor, a communication interface, and memory may receive, via the communication interface and from a first communication device associated with a first user, first user information. The first user information may comprise first authentication information corresponding to the first user, and first location information corresponding to a location of the first communication device. The computing platform may determine, based on at least the first authentication information, a profile corresponding to the first user. The computing platform may determine, based on the profile corresponding to the first user, a first visual data file. The computing platform may determine based on the first location information, a first display device. The first display device may be among a plurality of display devices. Each of the plurality of display devices may be associated with a corresponding playlist comprising of corresponding visual data files. The computing platform may add the first visual data file to a first playlist associated with the first display device. Adding the first visual data file to the first playlist may comprise associating the first visual data file with information corresponding to the first user. The computing platform may transmit, via the communication interface and to the first display device, data corresponding to the first visual data file.

In some arrangements, the computing platform may receive second location information corresponding to the first user. The computing platform may determine, based on the second location information corresponding to the first user, a second display device, among the plurality of display devices. The computing platform may scan the first playlist associated with the first display device, to determine that the first playlist comprises the first visual data file that is associated with the information corresponding to the first user. The computing platform may add the first visual data file to a second playlist associated with the second display device, and remove the first visual data file from the first playlist. The computing platform may transmit, via the communication interface and to the second display device, data corresponding to the first visual data file.

In some arrangements, the computing platform may receive, via the communication interface and from a second communication device associated with a second user, second user information. The second user information may comprise second authentication information corresponding to the second user, and second location information corresponding to a location of the second communication device. The computing platform may determine, based on at least the second authentication information, a profile corresponding to the second user. The computing platform may determine, based on the profile corresponding to the second user, a second visual data file. The computing platform may add the second visual data file to the first playlist. Adding the second visual data file to the first playlist may comprise associating the second visual data file to identification information corresponding to the second user. The computing platform may transmit the second visual data file to the first display device. The computing platform may transmit the second visual file data with the first visual file data.

In some arrangements, determining the first display device may comprises determining, based on the first location information and locations of the plurality of display devices, respective distances between the first communication device and each display device in the plurality of display devices. Thereafter, the computing platform may determine, based on the respective distances, that the first display device, is closest, among the plurality of display devices, to the first communication device.

In some arrangements, the first user information may comprise a user preference associated with a software application operating on the first communication device. The computing platform may determine the user preference associated with the software application. The computing platform may determine the first visual data file based on the user preference.

In some arrangements, the computing platform may compare the first authentication information with identification information stored in the memory. When the first authentication information conforms to the identification information stored in the memory, the computing platform may retrieve, from the memory, a first profile that is associated with the first user. The computing platform may further retrieve, from the memory, the first visual data file based on the first profile. When the first authentication information does not conform to the identification information stored in the memory, the computing platform may retrieve, from the memory, a second profile. The second profile may be a default profile. The computing platform may further retrieve, from the memory, the first visual data file based on the second profile.

In some arrangements, the memory may store a set of predefined profiles. Each predefined profile may be associated with a set of visual data files. The computing platform may determine the profile corresponding to the first user by selecting a first predefined profile, from the set of predefined profiles, based on the first user information. The computing platform may determine the first visual data file from a first set of visual data files associated with the first predefined profile.

In some arrangements, associating the first visual data file to information corresponding to the first user may comprise adding to the first playlist, the information corresponding to the first user. The information corresponding to the first user may comprise one of: the profile corresponding to the first user, the first authentication information corresponding to the first user, or identification information, corresponding to the first user, as stored in the memory.

In some arrangements, the first location information may comprise an indication of a second communication device that has established a connection with the first communication device. The computing platform may receive, from the second communication device, an indication that the first communication device has disconnected from the second communication device. The computing platform may remove, based on the indication, the first visual data file from the first playlist. The computing platform may stop transmitting, to the first communication device and based on removal of the first visual data file from the first playlist, data corresponding to the first visual data file.

In some arrangements, the computing platform may remove, after a predetermined duration of time, the first visual data file from the first playlist. The computing platform may stop transmitting, to the first communication device and based on removal of the first visual data file from the first playlist, data corresponding to the first visual data file.

In some arrangements, the first location information may comprise an indication of the first display device. The computing platform may determine the indication of the first display device based on a measurement as determined by the first communication device.

In some arrangements, each display device of the plurality of display devices is associated with a corresponding beacon, and each beacon transmits one or more messages comprising a respective beacon identifier. The first location information may comprise an indication of a first beacon identifier associated with a first beacon. The first beacons may be associated with the first display device. The computing platform may determine the first display device by identifying the indication of the first beacon identifier.

These features, along with many others, are discussed in greater detail below.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for determining visual content for delivery to display devices, and transmitting the visual content, based on location detection technologies. Various arrangements described herein may leverage location detection technologies generally associated with personal communication devices (e.g., cellphones, or the like). A particular location (e.g., a public location, a location associated with an organization) may comprise a plurality of display screens for display of visual content. Presence of a user at the location may be determined based on a location of a personal communication device that is associated with the user. A display screen, of the plurality of display screens, may be selected based on the location of the personal communication device (e.g., the display screen may be a closest display screen, among the plurality of display screens, to the personal communication device). A visual data file may be selected based on an identification of the user and a profile corresponding to the user. The visual data file may be added to a playlist associated with the selected display screen. The visual data file may be transmitted for display on the selected display screen. Delivery of visual content based on location of a personal communication device associated with a user, and further based on an identification of the user may enable targeted delivery of visual content that is relevant to that specific user.

Figure 1A:
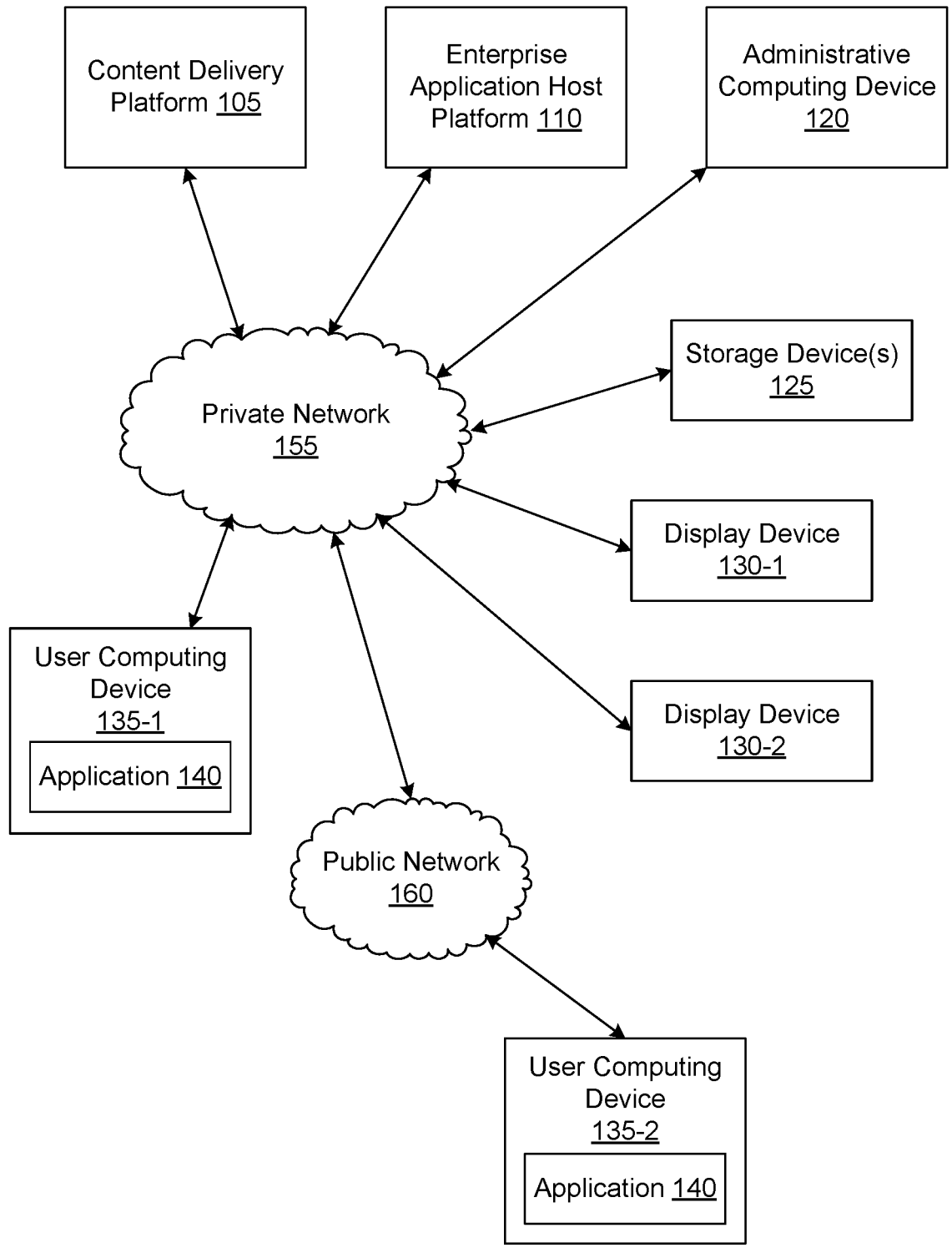
FIGS. 1A and 1B depict an illustrative computing environment for transmission of visual content to display devices, in accordance with one or more example arrangements.
Figure 1B:
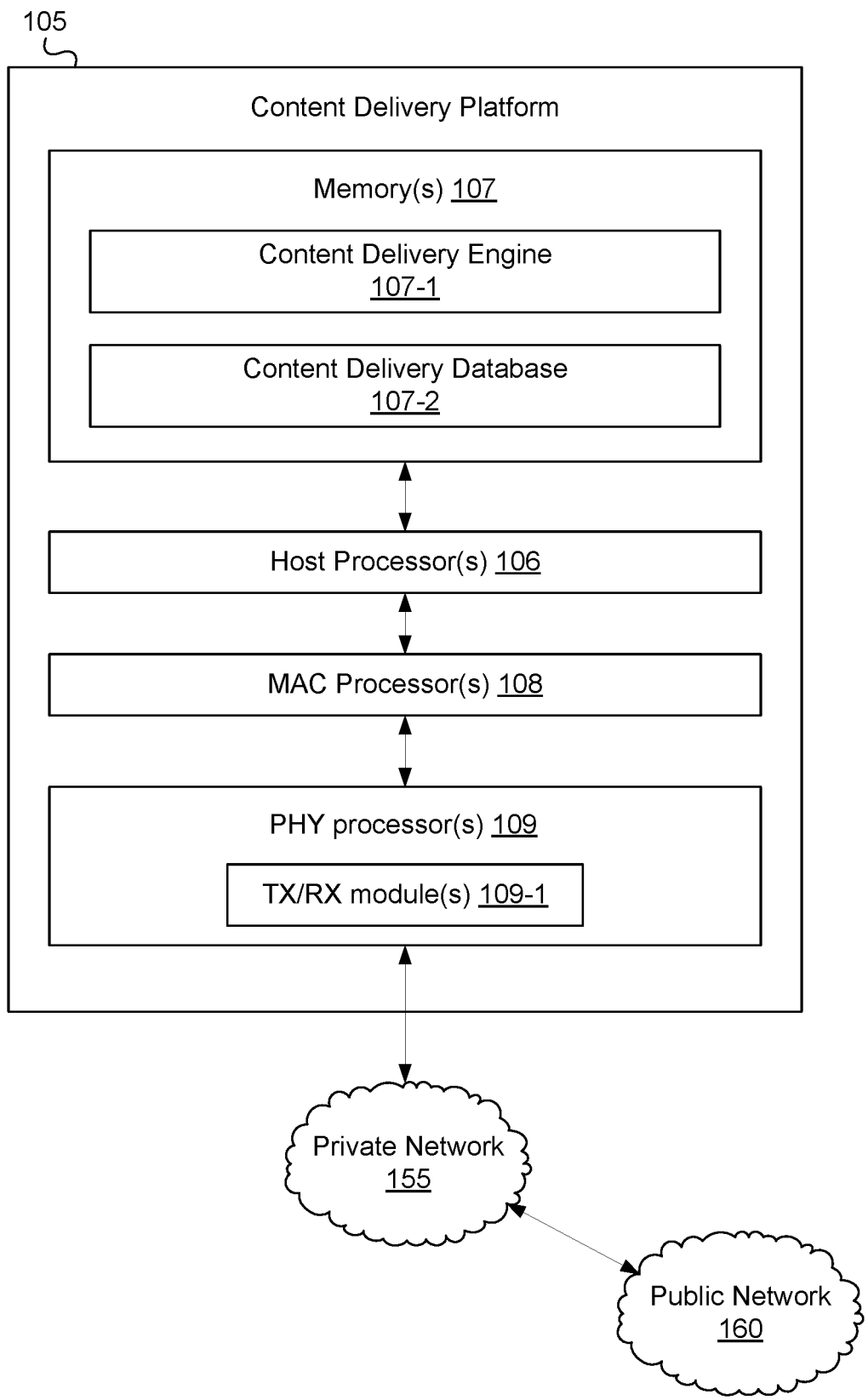

FIGS. 1A and 1B depict an illustrative computing environment for transmission of visual content to display devices, in accordance with one or more example arrangements. Referring to FIG. 1A, a computing environment 100 may comprise one or more devices (e.g., computer systems, communication devices, display devices, and/or the like). The computing environment 100 may comprise, for example, a content delivery platform 105, an enterprise application host platform 110, an administrative computing device 120, storage device(s) 125, display devices 130, and/or user computing devices 135. One or more devices and systems in the computing environment 100 may be linked over communication networks, such as a private network 155 and a public network 160. The communication networks may use wired and/or wireless communication protocols.

An organization may operate and/or be associated with the private network 155 and/or one or more devices/systems within the private network 155. The organization may correspond to any government or private institution, an educational institution, a financial institution, health services provider, retailer, or the like. The private network 155 may correspond to, for example, a local area network (LAN), a wide area network (WAN), a peer-to-peer network, or the like. The private network 155 may connect, for example, the content delivery platform 105, the enterprise application host platform 110, the enterprise user computing device 115, the administrative computing device 120, the display devices 130, and/or a user computing device 135-1. The private network may be linked to the public network 160.

A user in a context of the computing environment 100 may, for example, be a client, an employee, an affiliate, attendee or the like, of an organization operating within/associated with the private network 155. An external user (e.g., a client) may avail services being provided by the organization, and/or access one or more resources located within the private network 155 (e.g., using the public network 160). A user in the context of the computing environment 100 may, for example, be a user who is not associated with the organization (e.g., not a client of the organization). Users may operate one or more devices in the computing environment 100 to send messages to and/or receive messages to one or more other devices connected to the computing environment 100.

As illustrated in greater detail below, the content delivery platform 105 may comprise one or more computing devices configured to perform one or more of the functions described herein. The content delivery platform 105 may comprise, for example, one or more computers (e.g., laptop computers, desktop computers, servers, server blades, or the like).

The enterprise application host platform 110 may comprise one or more computing devices and/or other computer components (e.g., processors, memories, communication interfaces). The enterprise application host platform 110 may be configured to host, execute, and/or otherwise provide one or more enterprise applications. The enterprise application host platform 110 may be configured, for example, to host, execute, and/or otherwise provide one or more transaction processing programs, user servicing programs, and/or other programs associated with the organization. The enterprise application host platform 110 may be configured to provide various enterprise and/or back-office computing functions for the organization. The enterprise application host platform 110 may comprise various servers and/or databases that store and/or otherwise maintain account information, such as financial/membership account information including account balances, transaction history, account owner information, and/or other information corresponding to one or more users (e.g., external users). The enterprise application host platform 110 may process and/or otherwise execute transactions on specific accounts based on commands and/or other information received from other computer systems comprising the computing environment 100. The enterprise application host platform 110 may receive data from the content delivery platform 105, manipulate and/or otherwise process such data, and/or return processed data and/or other data to the content delivery platform 105 and/or to other computer systems in the computing environment 100.

The administrative computing device 120 may be a personal computing device (e.g., desktop computer, laptop computer) or mobile computing device (e.g., smartphone, tablet). The administrative computing device 120 may be linked to and/or operated by an administrative user (who may, for example, be a network administrator of the organization). The administrative computing device 120 may receive data from the content delivery platform 105, manipulate and/or otherwise process such data, and/or return processed data and/or other data to the content delivery platform 105 and/or to other computer systems in the computing environment 100. The administrative computing device 120 may be configured to control operation of the content delivery platform 105.

The storage device(s) 125 may comprise various memory devices such as hard disk drives, solid state drives, magnetic tape drives, or other electronically readable memory, and/or the like. The storage device(s) 125 may be used to store data corresponding to one or more users corresponding to the organization. The storage device(s) 125 may store visual content (e.g., picture and/or video content) for delivery to the display devices 130. The storage device(s) 125 may receive data from the security platform 105, store the data, and/or transmit the data to the security platform 105 and/or to other computing systems in the computing environment 100.

The display devices 130 (e.g., the display device 130-1 and the display device 130-2) may be present at a location/site of the organization. The display devices 130 may comprise display screens such as (but not limited to) light emitting diode (LED) screens, liquid crystal displays (LCDs), plasma displays, e-ink displays, segment displays, quantum dot LED (QLED) screens, and/or the like. The display devices 130 may display visual content (e.g., picture and/or video content) that is received from, for example, the content delivery platform 105. The display devices 130 may also be touch screens that are configure to receive an input (e.g., a touch input). The display screens 130 may, for example, transmit a signal, corresponding to a received input, to the content delivery platform 105 and/or to other devices connected to the private network 155.

The user computing devices 135 (e.g., the user computing device 135-1 and a user computing device 135-2) may be personal computing devices (e.g., laptop computers) or mobile computing device (e.g., smartphones, tablets, wearable devices), among others. The user computing device 135 may be linked to and/or operated by a user (e.g., a client) associated with the organization and who may interact with one or more enterprise resources while using the user computing devices 135. The user computing devices 135 may use a communication protocol (e.g., an 802.11a/b/g/n/ac "Wi-Fi" protocol, a cellular protocol, and/or the like) to connect to the one or more devices in the computing environment 100, and/or to the private network 155. The user computing device 135-1, for example, may use a Wi-Fi communication protocol to establish a connection with an access point associated with the private network 155. The user computing device 135-2, for example, may use a 5G cellular protocol to establish a connection with a picocell or a femtocell associated with a 5G service provider, and connect to the public network 160.

An application 140 may be installed on the user computing devices 135. The application 140 may perform one or more functions associated with services provided by the organization. The application 140 may be a software application running on an operating system of the user computing device 135, or may be built into the framework of the operating system itself. The application 140 may be operated and maintained by the organization. A user may use the application 140 to perform various actions related to account/membership management and modification of personal information, and/or use the application 140 to access various facilities and services provided by the organization.

The content delivery platform 105, the enterprise application host platform 110, the administrative computing device 120, the storage device(s) 125, the display devices 130, the user computing devices 135, and/or one or more other systems/devices in the computing environment 100 may be any type of computing device capable of receiving input via a user interface, and communicating the received input to one or more other computing devices. The content delivery platform 105, the enterprise application host platform 110, the administrative computing device 120, the storage device(s) 125, the display devices 130, the user computing devices 135, and/or other systems/devices in the computing environment 100 may, in some instances, be and/or include server computers, desktop computers, laptop computers, tablet computers, smart phones, wearable devices, or the like that may comprised of one or more processors, memories, communication interfaces, storage drives, and/or other components. Any and/or all of the content delivery platform 105, the enterprise application host platform 110, the administrative computing device 120, the storage device(s) 125, the display devices 130, the user computing devices 135, and/or other systems/devices in the computing environment 100 may, in some instances, be special-purpose computing devices configured to perform specific functions.

Referring to FIG. 1B, the content delivery platform 105 may comprise one or more of host processor(s) 106, memory 107, medium access control (MAC) processor(s) 108, physical layer (PHY) processor(s) 109, transmit/receive (TX/RX) module(s) 109-1, or the like. One or more data buses may interconnect host processor(s) 106, memory 107, MAC processor(s) 108, PHY processor(s) 109, and/or Tx/Rx module(s) 109-1. The content delivery platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages and/or information transmitted from and/or received at devices/systems in the computing environment 100 may be encoded in one or more MAC data units and/or PHY data units. The MAC processor(s) 108 and/or the PHY processor(s) 109 of the content delivery platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 over the private network 155 and/or the public network 160. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the content delivery platform 105 are configured to execute machine readable instructions stored in memory 107. Memory 107 may comprise (i) one or more program modules/engines having instructions that when executed by the one or more processors cause the content delivery platform 105 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the content delivery platform 105 and/or by different computing devices that may form and/or otherwise make up the content delivery platform 105. For example, memory 107 may have, store, and/or comprise a content delivery engine 107-1, and content delivery database 107-2. The content delivery engine 107-1 may have instructions that direct and/or cause the content delivery platform 105 to perform one or more operations, as discussed in greater detail below. The content delivery database 107-2 may store user information corresponding to users and/or devices operating within the computing environment 100. The content delivery database 107-2 may store, for each client, for example, services (e.g., from the organization) being availed, a level of service being provided, an activity history with respect to the organization, an activity history within the application 140 installed on the user computing device 135, preferences (e.g., language preferences) associated with the client, and/or the like. The content delivery database 107-2 may store, for each client, identification information (e.g., name, identification number, account number, telephone number, address, and/or the like). The content delivery database 107-2 may store visual content (e.g., picture and/or video content) for delivery to the display devices 130. Information stored in the content delivery database 107-2 may be used to determine visual content to be delivered to the display devices 130.

While FIG. 1A illustrates the content delivery platform 105 as being separate from other elements connected in private network 155, in one or more other arrangements, the content delivery platform 105 may be included in one or more of the enterprise application host platform 110, the administrative computing device 120, the storage device(s) 125, and/or any other device/system in the private network 155. Elements in the content delivery platform 105 (e.g., host processor(s) 105, memory(s) 107, MAC processor(s) 108, PHY processor(s) 109, and TX/RX module(s) 111, one or more program modules and/or stored in memory(s) 107) may share hardware and software elements with and corresponding to, for example, one or more of the enterprise application host platform 110, the administrative computing device 120, and/or any other device/system in the private network 155.

Figure 2A:
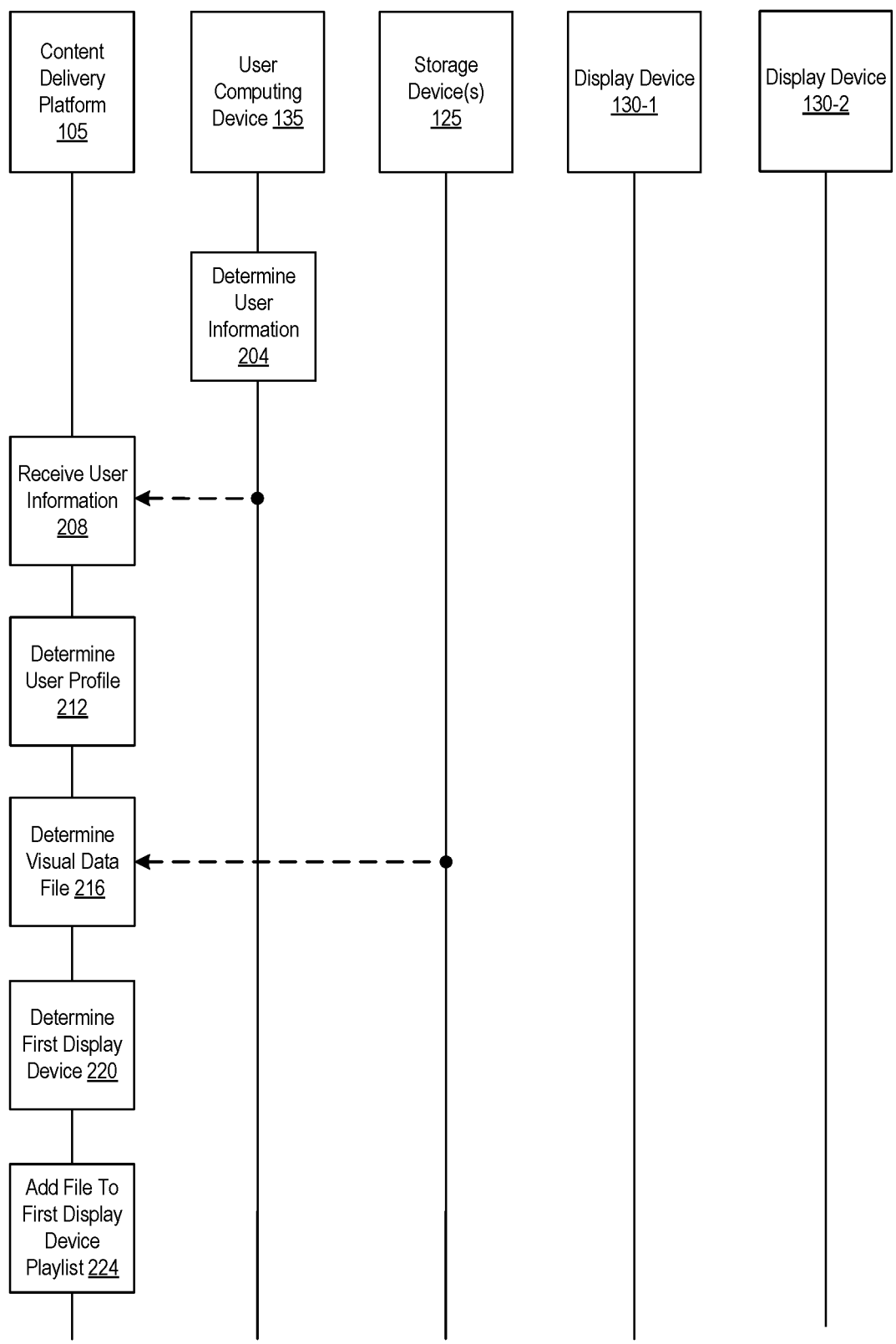
FIGS. 2A and 2B depict an illustrative event sequence for transmission of visual content to display devices, in accordance with one or more example arrangements.
Figure 2B:
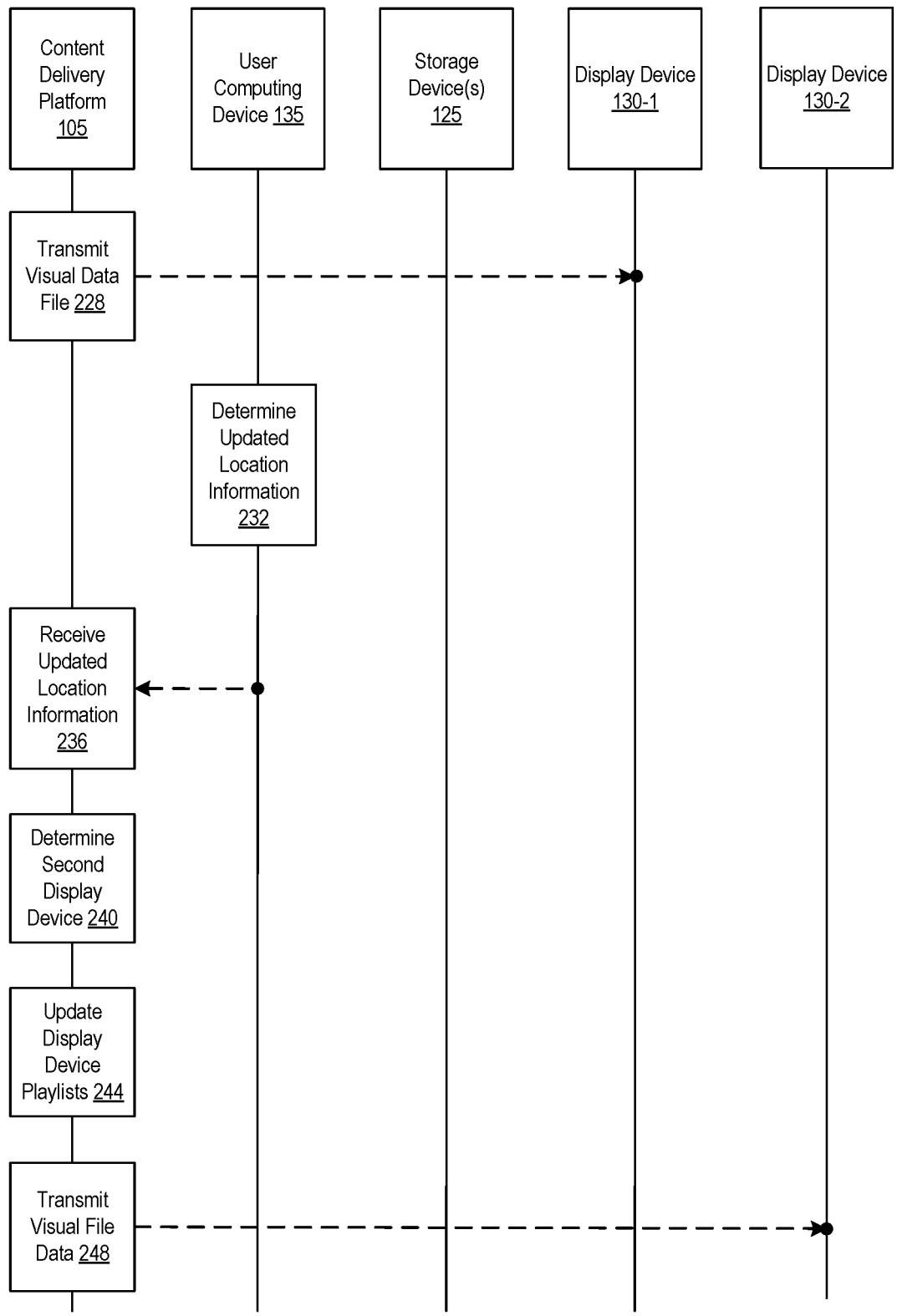

FIGS. 2A and 2B depict an illustrative event sequence for transmission of visual content to display devices, in accordance with one or more example embodiments. The display devices may be present at a site of an organization (e.g., an office site, a customer assistance center, a retail location, a conference center, and/or the like). The illustrative event sequence is described with reference to the computing environment 100 merely as an example. In other embodiments, the illustrative event sequence occurs in a computing environment different from the computing environment 100. In various arrangements described herein, the user computing device 135 and/or the content delivery platform 105 may use one or more algorithms that are based on one or more steps described with reference to FIGS. 2A and 2B for generation and transmission of visual content to the display devices.

Referring to FIG. 2A, at step 204, the user computing device 135 (e.g., the user computing device 135-1 or the user computing device 135-2) may determine user information corresponding to a user (e.g., a user at the site of the organization) and/or the user computing device 135 associated with the user. The user information may comprise one or both of authentication information corresponding to a user associated with the user computing device 135, and location information corresponding to the user computing device 135. The authentication information may comprise, for example, information such as an account number, customer number, a telephone number associated with the user computing device 135, a user name, address of the user, and/or the like. The user information may further comprise information corresponding to an indication of whether an application (e.g., the application 140) is installed on the user computing device 135, settings corresponding to the application, activity of the user in the application, services being availed by the user, services/products that may have been flagged by the user (e.g., using the application), an activity history with respect to the organization/application, preferences (e.g., language preferences) associated with the user, and/or the like.

The location information may comprise, for example, global navigation satellite system (GNSS) coordinates (e.g., global positioning system, GPS, coordinates), indication (e.g., identification information) corresponding to a 5G femtocell the user computing device 135 is connected to, indication (e.g., identification information) corresponding to a Wi-Fi access point the user computing device 135 is connected to, and/or the like. The location information may comprise, for example, an identification/indication of a display device, among the plurality of display devices 130 present at the site of the organization.

The user computing device 135 may receive an identification of the display device (e.g., as input by a user, or as measured by the user computing device 135). The user computing device 135 may, for example, measure identification information corresponding to the display device 130 to determine an identification of the display device 130. The user computing device 135 may, for example, scan a QR code or a bar code associated with the display device 130 to obtain an identification of the display device 130. The user computing device 135 may scan an NFC tag associated with the display device 130 to obtain an identification of the display device 130.

In various arrangements, one or more beacons may be used at the site of the organization to determine location information corresponding to the user computing device 135. The beacons may emit/broadcast corresponding signals (e.g., a Bluetooth signal, a Wi-Fi signal, or the like). Each signal may be associated with a corresponding beacon identifier. Each signal may, for example, indicate a beacon number. The user computing device 135 may detect the signal, and determine a corresponding beacon identifier (e.g., the beacon number). The user computing device may determine the location information based on the determined beacon identifier. In an arrangement, each beacon may be associated with a corresponding display device 130. The user computing device 135 may determine a beacon number and/or the corresponding display device 130 to determine the location information. If the user computing device 135 receives signals from multiple beacons, the user computing device 135 may determine a beacon number and/or a corresponding display device 130 of a beacon associated with a strongest signal among the multiple signals.

At step 208, the content delivery platform 105 may receive one or more messages, comprising the determined user information, from the user computing device 135. The user computing device 135 may transmit the user information to the content delivery platform 105, based on a determination that the user computing device 135 is at the site of the organization. The user computing device 135 may determine that it is at the site of the organization based on the location information, as determined at step 204. The user computing device 135 may, for example, compare the determined location information with prestored location information, in a database at the user computing device 135, corresponding to the site of the organization to determine that the user computing device 135 is at the site of the organization. The database may store, for example, location information corresponding to all sites associated with the organization.

The content delivery platform 105 may authenticate a user identity based on the authentication information. Authenticating a user identity may comprise determining whether the user is a client associated with the organization. The content delivery platform 105 may authenticate the user identity based on authentication information associated with the user (e.g., an account number, customer number, a telephone number associated with the user computing device 135, a user name, address of the user, and/or the like) as received at step 208.

The content delivery platform 105 may authenticate the user identity using information (e.g., identification information), corresponding to multiple users (e.g., clients of the organization), as stored in a database (e.g., content delivery database 107-2). The content delivery platform 105 may, for example, determine that the user is a client associated with the organization if the authentication information matches identification information as stored in the database. The content delivery platform 105 may, for example, determine that the user is not associated with the organization if the authentication information does not match identification information as stored in the database.

At step 212, the content delivery platform 105 may determine, based on authenticating the user identity and/or based on the received user information, a user profile corresponding to the user. The content delivery platform 105 may, for example, retrieve the user profile from a database (e.g., the content delivery database 107-2) based on authenticating the user identity and/or based on the user information. The database may comprise, for example, profiles corresponding to each client corresponding to the organization. The user profile may comprise, for example, the user information as received at step 208. The user profile may comprise, for example, an indication of an application (e.g., the application 140) installed on the user computing device 135, settings corresponding to the application, activity of the user in the application, services being availed by the user, services/products that may have been flagged by the user (e.g., using the application), an activity history with respect to the organization, preferences (e.g., language preferences) associated with the user, and/or the like.

In an arrangement, a plurality of predefined user profiles may be used to determine a user profile corresponding to the user. Each user profile, of the plurality of user profiles, may correspond to different configurations related to applications installed on the user communication device, user settings, user activity, services, and or the like. The content delivery platform 105 may determine, based on authenticating the user identity and/or based on the received user information, that the first predefined user profile corresponds to the user if the content delivery platform determines, for example, that a first application is installed on the user computing device 135. The content delivery platform 105 may determine, based on authenticating the user identity and/or based on the received user information, that the second predefined user profile corresponds to the user if the content delivery platform 105 determines, for example, that a second application is installed on the user computing device 135, or the first application is not installed on the user computing device.

The content delivery platform 105 may set the user profile to a default user profile if the content delivery platform 105 is unable to authenticate a user identity based on the determined authentication information. The content delivery platform 105 may be unable to authenticate the user identity if the user is not associated with the organization.

At step 216, the content delivery platform 105 may determine one or more visual data files corresponding to the determined user profile. The content delivery platform 105 may process, for example, the user profile to determine the one or more visual data files. The one or more visual data files may be determined, for example, based on prior user activity, services being availed by the user, services/products flagged by the user, user account information, an application installed on the user computing device 135, and/or the like. In an arrangement, for example, if the user previously flagged a service of the organization, the one or more visual data files may correspond to an image/video that indicates further information related to the service.

In an arrangement, the content delivery platform 105 may determine one or more visual data files based on an application installed on the user computing device 135 and/or a setting associated with an application installed on the user computing device 135. For example, the content delivery platform 105 may determine a first set of one or more visual data files if the application 140 corresponds to a first application (e.g., a Spanish language application associated with the organization), and may determine a second set of one or more visual data files if the application 140 corresponds to a second application (e.g., an English language application associated with the organization). The content delivery platform 105 may determine a first set of one or more visual data files if a first setting is associated with the application 140 (e.g., the application 140 is set to display content and/or receive input in Spanish language), and may determine a second set of one or more visual data files if a second setting is associated with the application 140 (e.g., the application 140 is set to display content and/or receive input in English language). The content delivery platform 105 may determine a default set of one or more visual data files if the content delivery platform 105 determines that the application 140 is not installed on the user computing device 135.

In an arrangement, each predefined user profile may be associated with a corresponding set of visual data files. The content delivery platform 105 may (i) determine, at step 212, that a predefined user profile corresponds to the user, and (ii) determine, at step 216, a visual data file from a set of visual data files associated with the predefined user.

Determining one or more visual data files may comprise, for example, determining location(s) of the one or more visual data files in the storage device(s) 125 and/or the content delivery database 107-2. Determining one or more visual data files may comprise, for example, retrieving one or more visual data files from the storage device(s) 125, and storing the files in the content delivery database 107-2. The content delivery platform 105 may determine one or more default visual data files if the content delivery platform 105 is unable to determine a user profile/determines that the user profile is the default user profile (e.g., if the content delivery platform 105 is unable to authenticate the user identity).

At step 220, the content delivery platform 105 may determine (e.g., based on determined location information) a first display device, among the plurality of display devices 130 at the site of the organization, on which to display visual content corresponding to the determined one or more visual data files. The content delivery platform 105 may determine a first display device based on the distances of the display devices 130 from the user computing device 135. Locations of the display devices 130 may be, for example, stored in a database (e.g., the content delivery database 107-2) at the content delivery platform 130, and may be used to determine the first display device based on the received location information. The content delivery platform 105 may determine the first display device, among the plurality of display devices 130, that is closest to the location of the user computing device 135. The content delivery platform 105 may use the location information (e.g., GNSS coordinates, 5G femtocell information, Wi-Fi access point information) received at step 204, and further use the locations of the display devices 130, to determine the first display device that is closest to the location of the user computing device 135.

The content delivery platform 105 may determine the display device based on a received indication from the user computing device 135. The content delivery platform 105 may receive an indication corresponding to a display device (e.g., an identification, a code, an NFC tag reading, and/or the like), and determine the display device based on the received indication.

In an arrangement, the user computing device 135 may determine (e.g., based on determined location information) a first display device, among the plurality of display devices 130 at the site of the organization, on which to display visual content corresponding to the determined one or more visual data files. The user computing device 135 may determine a first display device based on, for example, the distances of the display devices 130 from the user computing device 135. Locations of the display devices 130 may be, for example, stored in a database at the user computing device 135, and may be used to determine the display device based on the determined location information. The user computing device 135 may transmit an indication of the determined display device to the content delivery platform 105. The content delivery platform 105 may determine the display device based on the indication as transmitted by the user computing device 135.

Determining the first display device may comprise associating, at the content delivery platform 105, the user computing device 135 with the first display device. The content delivery platform 105 may store, for example, the user information (e.g., the authentication information) and further associate the user information with an identification of the first display device. The content delivery platform 105 may store, in a database (e.g., the content delivery database 107-2), a look-up table, wherein the look-up comprises the user information and the associated first display device.

In an arrangement, each of the display devices 130 may be associated with a corresponding visual content playlist. Visual content playlists corresponding to the display devices 130 may be stored in the content delivery database 107-2. At step 224, the content delivery platform 105 may add the one or more visual data files (e.g., as determined at step 216) to a playlist associated with the first display device (e.g., as determined at step 220). Adding the one or more visual data files to the playlist may comprise adding pointer(s), to the location(s) of the one or more visual data files in the storage device(s) 125 and/or the content delivery database 107-2, to the playlist. Adding the one or more visual data files to the playlist may comprise copying the one or more visual data files in the storage devices(s) 125 to the playlist. Adding the one or more visual data files may further comprise associating the one or more visual data files to identification information corresponding to the user (e.g., stored in the content delivery database 107-2), authentication information corresponding to the user (e.g., received step 208), and/or other information from the determined user profile (e.g., the account number, the customer number, the telephone number associated with the user computing device 135, the user name, the address of the user, and/or the like). The playlist may comprise, for example, the identification information and the one or more visual data files that are associated with the user identification/authentication information.

With reference to FIG. 2B, at step 228, the content delivery platform 105 may transmit content of the one or more visual data files to the first display device. Step 228 illustrates an exemplary arrangement wherein the content delivery platform 105 determines that the display device 130-1 is closest to the user computing device 135, among the plurality of display devices 130, and transmits content corresponding to the one or more visual data files to the display device 130-1. In other arrangements, however, the content delivery platform 105 determines that the display device 130-2 is closest to the user computing device 135, among the plurality of display devices 130, and transmits content corresponding to the one or more visual data files to the display device 130-2. The first display device may display content corresponding to the one or more visual data files.

The content delivery platform 105 may further be used to maintain a waiting line of clients at the site of the organization. The waiting line may be used to inform the clients about the order in which the clients are to be requested to approach an area of service. The content delivery platform 105 may transmit visual content related to the waiting line to the first display device. The first display device may display the visual content related to the waiting line along with the one or more visual data files.

The content delivery platform 105 may remove the one or more visual data files from the playlist associated with the first display device, for example, after a predefined duration of time. The content delivery platform 105 may remove the one or more visual data files from the playlist associated with the first display device, for example, if the user computing device 135 disconnects from a 5G femtocell or a Wi-Fi access point (e.g., as used for determining the location information at step 204). The content delivery platform 105 may, for example, receive an indication from a Wi-Fi access point, that the user computing device 135 has disconnected from the private network 155, and remove the one or more visual data files from the playlist associated with the first display device. The content delivery platform 105 may remove the one or more visual data files from the playlist associated with the first display device, for example, based on a notification (e.g., from the user computing device 135) for removal of the one or more visual data files from the playlist. The notification may be transmitted by the user computing device 135 in response to an input by the user at an interface corresponding to the user computing device 135.

At step 232, the user computing device 135 may determine updated location information corresponding to the user computing device 135. The updated location information may comprise updated GNSS coordinates corresponding to the user computing device 135, updated indication (e.g., identification information) corresponding to a 5G femtocell the user computing device 135 is connected to, updated indication (e.g., identification information) corresponding to a Wi-Fi access point the user computing device 135 is connected to, an updated identification/indication of a display device (e.g., as entered at/scanned by the user computing device 135), an updated indication of a beacon, and/or the like. The user computing device 135 may transmit the updated location information to the content delivery platform 105. The user computing device 135 may use one or more techniques described above with reference to step 204 to determine the updated location information. In an arrangement, the user computing device 135 may only transmit the updated location information if the user computing device 135 determines that the updated location information is different from the location information as determined at step 204.

In an arrangement, the user computing device 135 may only transmit the updated location information if the user computing device 135 determines that the updated location information will result in a selection of a new display device different from the first display device. The locations of the display devices 130, for example, may be stored in a database corresponding to the user computing device 135, and may be used by the user computing device to determine if the updated location information will result in a selection of a new display device different from the first display device.

At step 236, the content delivery platform 105 may receive one or more messages comprising the updated location information (e.g., as determined by the user computing device 135 at step 232). In an arrangement, the content delivery platform 105 may further receive the authentication information (e.g., as determined by the user computing device 135 at step 204). The content delivery platform 105 may authenticate a user identity based on the authentication information.

At step 240, the content delivery platform 105 may determine a second display device, among the plurality of display devices 130 at the site of the organization, on which to display visual content corresponding to the determined one or more visual data files. The content delivery platform may use the updated location information, and/or use one or more techniques as described above with reference to step 220, to determine the second display device.

The content delivery platform 105 may, for example, determine a second display device based on the distances of the display devices 130 from the user computing device 135. Locations of the display devices 130 may be, for example, stored in a database (e.g., the content delivery database 107-2) at the content delivery platform 130, and may be used to determine the second display device based on the received updated location information. The content delivery platform 105 may determine a second display device, among the plurality of display devices 130, that is closest to the location of the user computing device 135. The content delivery platform 105 may use the updated location information (e.g., GNSS coordinates, 5G femtocell information, Wi-Fi access point information) received at step 232, and further use the locations of the display devices, to determine the second display device that is closest to the location of the user computing device 135.

The content delivery platform 105 may determine a second display device based on a received indication from the user computing device 135. The content delivery platform 105 may receive an indication corresponding to a display device (e.g., an identification, a code, an NFC tag reading, and/or the like), and determine the second display device based on the received indication.

At step 244, the content delivery platform 105 may update a playlist associated with the second display device. The content delivery platform may add the one or more visual data files to a playlist associated with the second display device. Adding the one or more visual data files to the playlist may comprise adding pointer(s), to the location(s) of the one or more visual data files in the storage device(s) 125, to the playlist. Adding the one or more visual data files to the playlist may comprise copying the one or more visual data files in the storage devices(s) to the playlist. The content delivery platform 105 may further remove the one or more visual data files from the playlist associated with the first display device.

In an arrangement, the content delivery platform 105 may not process the user profile again to update the playlist associated with the second display device. The content delivery platform 105 may, for example, authenticate the user based on authentication information received at step 232 and add the same one or more visual data files (e.g., as determined at step 212) to a playlist associated with the second display device (e.g., as determined at step 240). The content delivery platform 105 may, for example, move the contents of the playlist associated with the first display device to the playlist associated with the second display device. The content delivery platform 105 may remove the one or more visual data files (corresponding to the user) from the playlist associated with the first display device.

The content delivery platform 105 may, for example, scan playlists corresponding to the display devices 130 for visual data files associated with the user. The content delivery platform 105 may, for example, scan the playlists for the authentication information corresponding to the user and determine the one or more visual data files that are associated with the authentication information. If the content delivery platform 105 determines that the authentication information is included in a playlist, the content delivery platform may move the one or more visual data files to the playlist associated with the second display device.

Scanning the playlists corresponding to the display device 130 to determine the one or more visual data files associated with the user may comprise scanning a database, at the content delivery platform 105, to determine the first display device associated with the user/user computing device 135. The content delivery platform 105 may scan the first playlist associated with the first display device for the authentication information (e.g., as received at step 208 and/or step 236), and determine the one or more visual data files. In an arrangement, not processing the information associated with the user profile again to determine the one or more visual data files, after receiving the updated location information, may improve processing speed and efficiency of the content delivery platform 105.

At step 248, the content delivery platform 105 may transmit content of the one or more visual data files to the determined second display device. Step 248 illustrates an exemplary arrangement wherein the content delivery platform 105 (i) determines that the display device 130-2 is the second display device, and (ii) transmits content, corresponding to the one or more visual data files, to the display device 130-2.

Figure 3A:
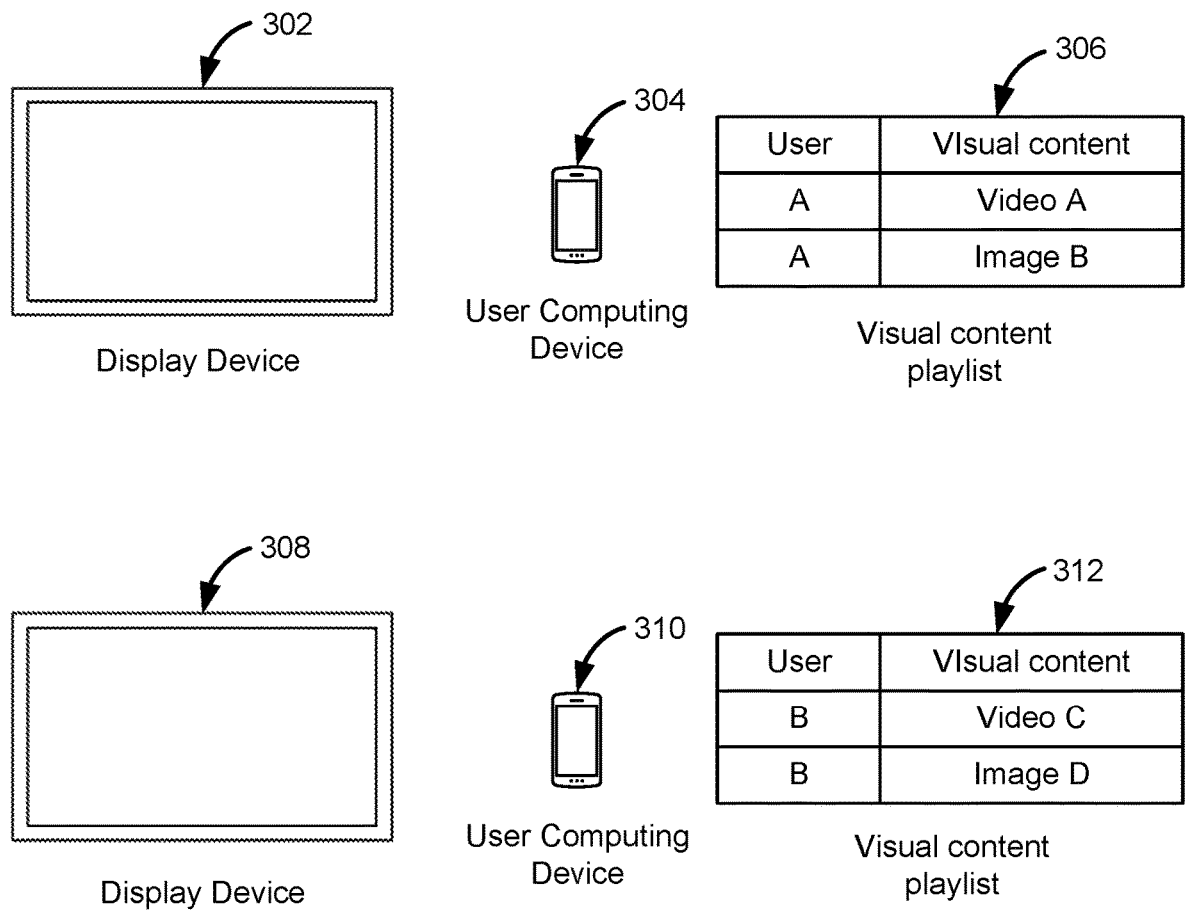
FIGS. 3A and 3B shows an example technique for generation and transmission of visual content to a plurality of display devices, in accordance with one or more example arrangements.
Figure 3B:
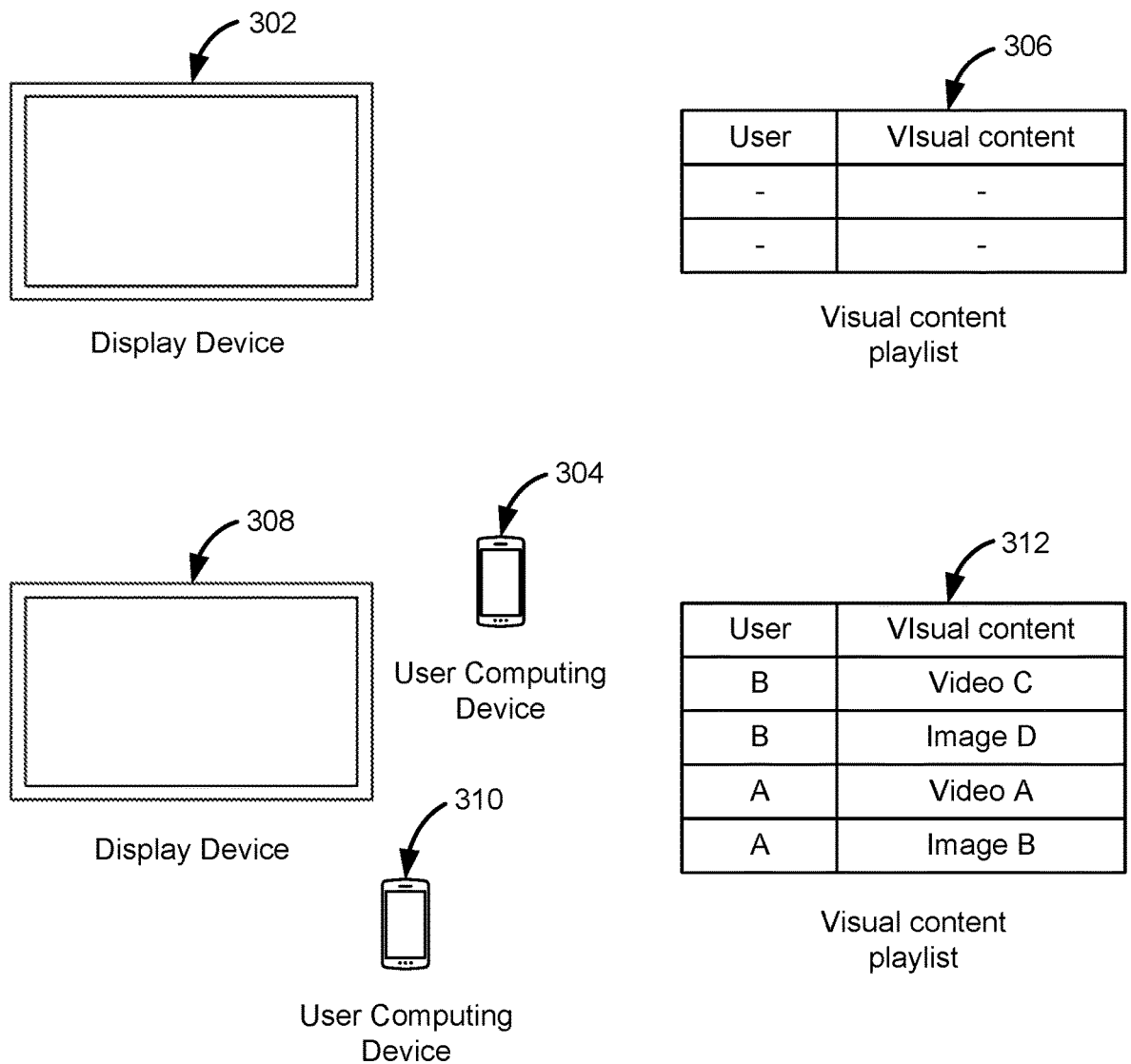

FIGS. 3A and 3B shows an example arrangement, wherein a content delivery platform is used for generation and transmission of visual content to a plurality of display devices. The content delivery platform is interfaced with at least two display devices 302 and 308 (e.g., that are located at a site of an organization operating a content delivery platform), and transmits visual content to the display devices. Each of the display devices 302 and 308 are associated with corresponding visual content playlists. The display device 302 is associated with visual content playlist 306, and the display device 308 is associated with visual content playlist 312. While FIGS. 3A and 3B is described with reference to two display devices, in other arrangements, more than two display devices may be present.

The content delivery platform may determine a location of user computing device 304 and a location of user computing device 310. The user computing device 304 may correspond to a first user ("User A") and the user computing device 310 may correspond to a second user ("User B"). The content delivery platform may, based on user information received from the user computing devices 304 and 310, authenticate User A and User B, and determine corresponding locations of the user computing devices 304 and 310. The user computing devices 304 and 310, and the content delivery platform may use, for example, one or more techniques described with reference to steps 204 and 208 to determine the user information.

The content delivery platform may further determine, based on the user information, user profiles associated with User A and User B. The content delivery platform may determine, based on a user profile of User A, visual data files "Video A" and "Image B" that correspond to the user profile of User B. The content delivery platform may determine, based on a user profile of User B, visual data files "Video C" and "Image D" that correspond to the user profile of User B. The content delivery platform may use one or more steps described with reference to step 216 to determine visual data files corresponding to the user profiles.

The content delivery platform may further determine, based on locations of the user computing devices 304 and 310, corresponding display devices. The content delivery platform may determine, for example, that the display device 302 is closest to the user computing device 304, and further determine that the display device 308 is closest to the user computing device 310. The content delivery platform may add the visual data files "Video A" and "Image B" to the visual content playlist 306. The visual content playlist 306 may further indicate that "Video A" and "Image B" correspond to User A. The content delivery platform may add the visual data files "Video C" and "Image D" to visual content playlist 312. The visual content playlist 312 may further indicate that "Video C" and "Image D" correspond to User B. The content delivery platform may transmit content corresponding to respective visual data files to the display devices 302 and 308.

With reference to FIG. 3B, the content delivery platform may determine an updated location of the user computing device 304. The content delivery platform may, based on user information received from the user computing devices 304, authenticate User A, and determine corresponding location of the user computing device 304. The content delivery platform may, for example, determine that the display device 308 is now closest to the user computing device 304. The content delivery platform may add the visual data files "Video A" and "Image B" to the visual content playlist 312 associated with the display device 308. The content delivery platform may, for example, scan the visual content playlist 306 and determine that visual content playlist 306 has visual data files corresponding to User A. The content delivery platform may, based on determining that the visual content playlist 306 has visual data files corresponding to User A, add the visual data files corresponding to User A to the visual content playlist 312. The content delivery platform may further remove the visual data files corresponding to User A from the visual content playlist 306. The content delivery platform may transmit, in one or more messages, content corresponding to the visual data files "Video A," "Image B," "Video C," and "Image D" to the display device 308. The content delivery platform may transmit content corresponding to the visual data files "Video A," "Image B," along with content corresponding to the visual data files "Video C," and "Image D."

Figure 4:
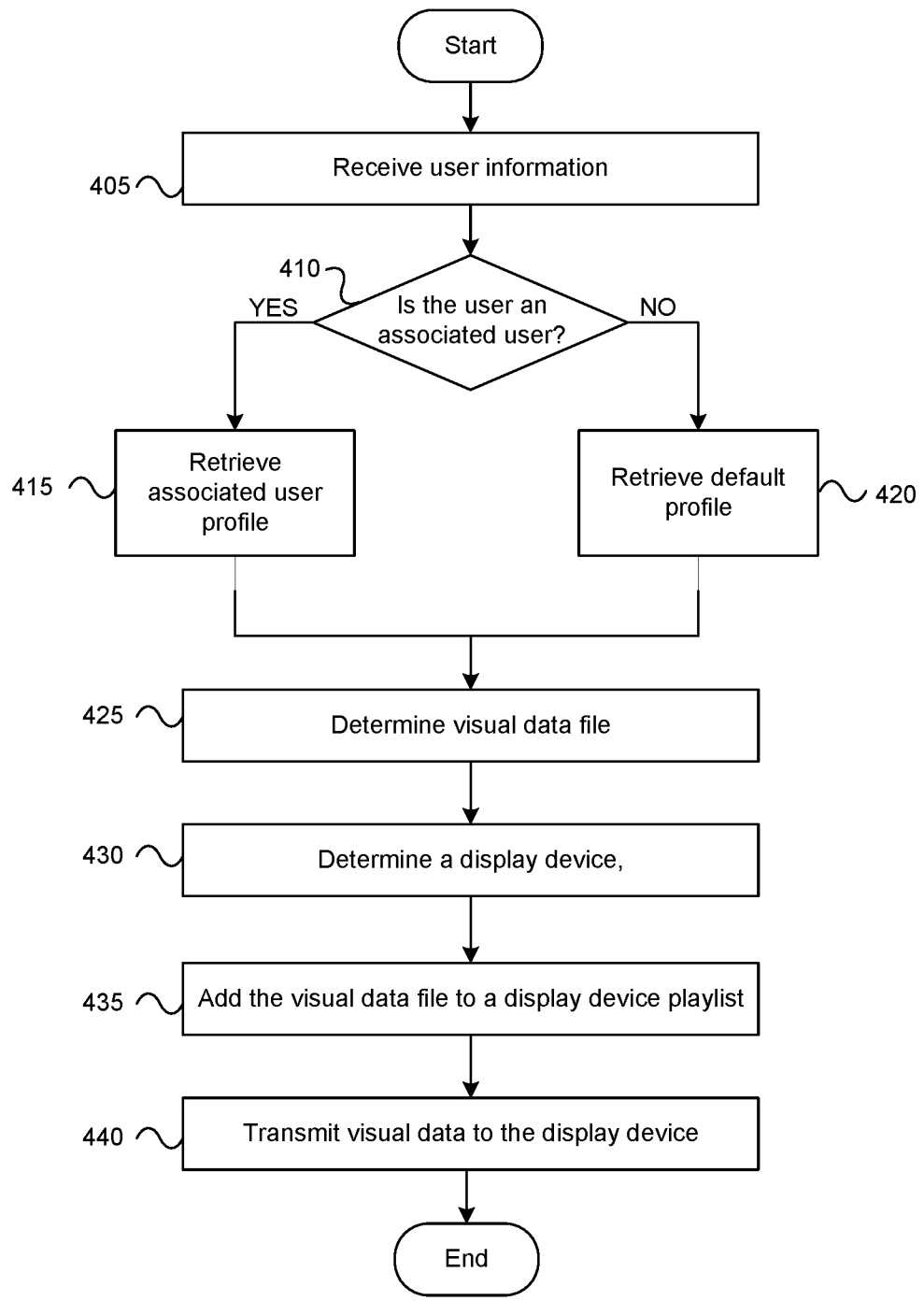
FIG. 4 shows an illustrative method for generation and transmission of visual content to a display device, among a plurality of display devices, in accordance with one or more example arrangements.

FIG. 4 shows an illustrative algorithm for generation and transmission of visual content to a display device, among a plurality of display devices, in accordance with one or more example arrangements. Referring to FIG. 4, at step 405, a computing platform comprising at least one processor, a communication interface, and memory may receive, via the communication interface and from a communication device associated with a user, user information. The user information may comprise authentication information and location information corresponding to a location of the communication device. The user information may comprise, for example, an account number associated with the user, a customer number, a telephone number associated with the communication device, a user name, address of the user, and/or the like. The communication device may correspond to a user computing device (e.g., a laptop computer, a mobile telephone, and/or the like). The location information may be GNSS coordinates, an indication of a display device, among a plurality of display devices, an indication of a Wi-Fi access point connected to the communication device, an indication of a 5G femtocell associated with the communication device, and/or the like. The user information may correspond to any information as determined at step 204.

At step 410, the computing platform may determine, based on at least the authentication information, if the user is an associated user of the organization. The computing platform may for example, authenticate a user identity based on the user information. At step 415, the computing platform may retrieve an associated user profile, for example, if the computing platform successfully authenticates the user identity. At step 420, the computing platform may retrieve a default profile, for example, if the computing platform is unable to authenticate the user identity. The computing platform may use one or more techniques as described with reference to step 212 to determine the user profile.

At step 425, the computing platform may determine, based on the determined profile corresponding to the user, a visual data file. The visual data file may be determined, for example, based on prior user activity, services being availed by the user, services/products flagged by the user, user account information, an application installed on the communication device, and/or the like. The visual data file may be a default visual data file that is associated with the default user profile, for example, if the computing platform retrieves the default user profile (e.g., at step 420). The computing platform may use one or more techniques as described with reference to step 216 to determine the visual data file based on the determined profile.

At step 430, the computing platform may determine, based on the location information, a display device. The display device may be, for example, among a plurality of display devices. Each display device among the plurality of display devices may be associated with a corresponding playlist comprising of corresponding visual data files.

At step 435, the computing platform may add the visual data file to a playlist associated with a display device (e.g., the display device as determined at step 420). Adding the visual data file to the playlist may comprises associating the visual data file with information corresponding to the user (e.g., authentication information, identification, and/or the like).

At step 440, the computing platform may transmit, via the communication interface and to the display device, data corresponding to the visual data file. The display device may display visual content based on receiving the data corresponding to the visual data file. In various arrangements, the computing platform may correspond to the content delivery platform 105 described with reference to FIGS. 1A, 1B, 2A, 2B, and 3A, 3B, or any other device that performs functions corresponding to FIG. 4.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface and from a first communication device associated with a first user, first user information, wherein the first user information comprises: first authentication information corresponding to the first user, and first location information corresponding to a location of the first communication device;
      determine, based on at least the first authentication information, a profile corresponding to the first user;
      determine, based on the profile corresponding to the first user, a first visual data file;
      determine, based on the first location information and among a plurality of display devices in a predefined proximity of the first communication device, a first display device that is closest to the first communication device, wherein each of the plurality of display devices is associated with a corresponding playlist comprising of corresponding visual data files;
      add the first visual data file to a first playlist, wherein the first playlist is associated with the first display device, wherein adding the first visual data file to the first playlist comprises associating the first visual data file with information corresponding to the first user; and
      transmit, via the communication interface and to the first display device, data corresponding to the first visual data file.

2. The computing platform of claim 1, wherein the memory stores additional computer-readable instructions that, when executed by the at least one processor, cause the computing platform to:
   receive second location information corresponding to a second location of the first communication device;
   determine, based on the second location information, a second display device, wherein the second display device is among the plurality of display devices;
   scan the first playlist associated with the first display device, wherein scanning the first playlist comprises determining that the first playlist comprises the first visual data file that is associated with the information corresponding to the first user;
   add the first visual data file to a second playlist, wherein the second playlist is associated with the second display device;
   remove the first visual data file from the first playlist; and
   transmit, via the communication interface and to the second display device, data corresponding to the first visual data file.

3. The computing platform of claim 1, wherein the memory stores additional computer-readable instructions that, when executed by the at least one processor, cause the computing platform to:
   receive, via the communication interface and from a second communication device associated with a second user, second user information, wherein the second user information comprises: second authentication information corresponding to the second user, and second location information corresponding to a location of the second communication device;
   determine, based on at least the second authentication information, a profile corresponding to the second user;
   determine, based on the profile corresponding to the second user, a second visual data file;
   add the second visual data file to the first playlist, wherein adding the second visual data file to the first playlist comprises associating the second visual data file to identification information corresponding to the second user; and
   transmit the second visual data file to the first display device, wherein the second visual file data is transmitted with the first visual file data.

4. The computing platform of claim 1, wherein determining the first display device comprises:
   retrieving, from the memory, locations of the plurality of display devices;
   determining, based on the first location information and the locations of the plurality of display devices, respective distances between the first communication device and each display device in the plurality of display devices; and
   determining, based on the respective distances, that the first display device, is closest, among the plurality of display devices, to the first communication device.

5. The computing platform of claim 1, wherein:
   the first user information comprises a user preference associated with a software application operating on the first communication device,
   determining the profile corresponding to the first user comprises determining the user preference associated with the software application, and
   determining the first visual data file comprises determining the first visual data file based on the user preference.

6. The computing platform of claim 1, wherein the memory stores a plurality of profiles, wherein the plurality of profiles comprises different profiles corresponding to different users, wherein determining the profile and determining the first visual data file comprises:
   comparing the first authentication information with identification information stored in the memory;
   when the first authentication information conforms to the identification information stored in the memory:
      retrieving, from the memory, a first profile that is associated with the first user, and
      retrieving, from the memory, the first visual data file based on the first profile; and
   when the first authentication information does not conform to the identification information stored in the memory:
      retrieving, from the memory, a second profile, wherein the second profile is a default profile, and retrieving, from the memory, the first visual data file based on the second profile.

7. The computing platform of claim 1, wherein:
the memory stores a set of predefined profiles,
each predefined profile is associated with a set of visual data files,
determining the profile corresponding to the first user comprises selecting, based on the first user information, a first predefined profile from the set of predefined profiles, and
determining the first visual data file comprises selecting the first visual data file from a first set of visual data files associated with the first predefined profile.

8. The computing platform of claim 1, wherein associating the first visual data file to information corresponding to the first user comprises, adding to the first playlist, the information corresponding to the first user, and wherein the information corresponding to the first user comprises one of:
the profile corresponding to the first user;
the first authentication information corresponding to the first user; or
identification information, corresponding to the first user, as stored in the memory.

9. The computing platform of claim 1, wherein the first location information comprises an indication of a second communication device that has established a connection with the first communication device, wherein the memory stores additional computer-readable instructions that, when executed by the at least one processor, cause the computing platform to:
receive, from the second communication device, an indication that the first communication device has disconnected from the second communication device;
remove, based on the indication, the first visual data file from the first playlist; and
stop transmitting, to the first communication device and based on removal of the first visual data file from the first playlist, data corresponding to the first visual data file.

10. The computing platform of claim 1, wherein the memory stores additional computer-readable instructions that, when executed by the at least one processor, cause the computing platform to:
remove, after a predetermined duration of time, the first visual data file from the first playlist; and
stop transmitting, to the first communication device and based on removal of the first visual data file from the first playlist, data corresponding to the first visual data file.

11. The computing platform of claim 1, wherein the first location information comprises an indication of the first display device, wherein the indication of the first display device is determined based on a measurement as determined by the first communication device.

12. The computing platform of claim 1, wherein:
each display device of the plurality of display devices is associated with a corresponding beacon, wherein each beacon transmits one or more messages comprising a respective beacon identifier;
the first location information comprises an indication of a first beacon identifier associated with a first beacon, wherein the first beacon is associated with the first display device, and
determining the first display device comprises identifying, based on the indication of the first beacon identifier, the first display device.

13. The computing platform of claim 1, wherein the predefined proximity is based on at least one of:
a visual proximity of the display device;
a wireless communication range of the first communication device;
a beacon range of the first communication device; or
a predefined geographic distance from the first communication device.

14. A method, at a computing platform comprising at least one processor, a communication interface, and memory, the method comprising:
receiving, via the communication interface and from a first communication device associated with a first user, first user information, wherein the first user information comprises: first authentication information corresponding to the first user, and first location information corresponding to a location of the first communication device;
determining, based on at least the first authentication information, a profile corresponding to the first user;
determining, based on the profile corresponding to the first user, a first visual data file;
determining, based on the first location information and among a plurality of display devices in a predefined proximity of the first communication device, a first display device that is closest to the first communication device, wherein each of the plurality of display devices is associated with a corresponding playlist comprising of corresponding visual data files;
adding the first visual data file to a first playlist, wherein the first playlist is associated with the first display device, wherein adding the first visual data file to the first playlist comprises associating the first visual data file with information corresponding to the first user; and
transmitting, via the communication interface and to the first display device, data corresponding to the first visual data file.

15. The method of claim 14, further comprising:
receiving second location information corresponding to a second location of the first communication device;
determining, based on the second location information, a second display device, wherein the second display device is among the plurality of display devices;
scanning the first playlist associated with the first display device, wherein scanning the first playlist comprises determining that the first playlist comprises the first visual data file that is associated with the information corresponding to the first user;
adding the first visual data file to a second playlist, wherein the second playlist is associated with the second display device;
removing the first visual data file from the first playlist; and
transmitting, via the communication interface and to the second display device, data corresponding to the first visual data file.

16. The method of claim 14, further comprising:
receiving, via the communication interface and from a second communication device associated with a second user, second user information, wherein the second user information comprises: second authentication information corresponding to the second user, and second location information corresponding to a location of the second communication device;
determining, based on at least the second authentication information, a profile corresponding to the second user;

determining, based on the profile corresponding to the second user, a second visual data file;
adding the second visual data file to the first playlist, wherein adding the second visual data file to the first playlist comprises associating the second visual data file to identification information corresponding to the second user; and
transmitting the second visual data file to the first display device, wherein the second visual file data is transmitted with the first visual file data.

17. The method of claim 14, wherein:
the first user information comprises a user preference associated with a software application operating on the first communication device,
determining the profile corresponding to the first user comprises determining the user preference associated with the software application, and
determining the first visual data file comprises determining the first visual data file based on the user preference.

18. The method of claim 14, wherein the memory stores a plurality of profiles, wherein the plurality of profiles comprises different profiles corresponding to different users, wherein determining the profile and determining the first visual data file comprises:
comparing the first authentication information with identification information stored in the memory;
when the first authentication information conforms to the identification information stored in the memory:
retrieving, from the memory, a first profile that is associated with the first user, and
retrieving, from the memory, the first visual data file based on the first profile; and
when the first authentication information does not conform to the identification information stored in the memory:
retrieving, from the memory, a second profile, wherein the second profile is a default profile, and
retrieving, from the memory, the first visual data file based on the second profile.

19. The method of claim 14, wherein:
the memory stores a set of predefined profiles,
each predefined profile is associated with a set of visual data files,
determining the profile corresponding to the first user comprises selecting, based on the first user information, a first predefined profile from the set of predefined profiles, and
determining the first visual data file comprises selecting the first visual data from a first set of visual data files associated with the first predefined profile.

20. The method of claim 14, wherein the first location information comprises an indication of the first display device, wherein the indication of the first display device is determined based on a measurement as determined by the first communication device.

21. The method of claim 14, wherein the predefined proximity is based on at least one of:
a visual proximity of the display device;
a wireless communication range of the first communication device;
a beacon range of the first communication device; or
a predefined geographic distance from the first communication device.

22. One or more non-transitory computer-readable media storing instructions that, when executed by a computing platform comprising at least one processor, a communication interface, and memory, cause the computing platform to:
receive, via the communication interface and from a communication device associated with a user, user information, wherein the user information comprises: authentication information corresponding to the user, and location information corresponding to a location of the communication device;
determine, based on at least the authentication information, a profile corresponding to the user;
determine, based on the profile corresponding to the user, a visual data file;
determine, based on the location information and among a plurality of display devices in a predefined proximity of the communication device, a display device that is closest to the communication device, wherein each of the plurality of display devices is associated with a corresponding playlist comprising of corresponding visual data files;
add the visual data file to a playlist, wherein the playlist is associated with the display device, wherein adding the visual data file to the playlist comprises associating the visual data file with information corresponding to the user; and
transmit, via the communication interface and to the display device, data corresponding to the visual data file.

* * * * *